(12) United States Patent
Milgrom et al.

(10) Patent No.: US 8,682,066 B2
(45) Date of Patent: Mar. 25, 2014

(54) DEVICES AND METHODS OF READING MONOCHROMATIC PATTERNS

(75) Inventors: Benjamin Milgrom, Natania (IL); Emanuel Marom, Tel-Aviv (IL); Naim Konforti, Holon (IL); Michael Golub, Rechovot (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 241 days.

(21) Appl. No.: 13/044,579

(22) Filed: Mar. 10, 2011

(65) Prior Publication Data
US 2011/0222763 A1    Sep. 15, 2011

Related U.S. Application Data

(60) Provisional application No. 61/312,675, filed on Mar. 11, 2010.

(51) Int. Cl.
*G06K 7/12* (2006.01)

(52) U.S. Cl.
USPC ....... 382/165; 382/190; 235/462.04; 235/469

(58) Field of Classification Search
USPC .................... 382/165, 190; 359/738, 569; 235/462.04, 469
See application file for complete search history.

(56) References Cited

U.S. PATENT DOCUMENTS

2009/0168117 A1*  7/2009  Kearney ................ 358/474

OTHER PUBLICATIONS

Garcia et al: "Chromatic aberration and depth extraction", Proc., IEEE 1, 2000.*
Milgrom et al. "Novel Approach for Extending the Depth of Field of Barcode Decoders by Using RGB Channels of Information", Optics Express, 18(16): 17027-17039, Aug. 2, 2010.

* cited by examiner

*Primary Examiner* — Ruiping Li

(57) ABSTRACT

A method of extracting data from an identifiable monochromatic pattern. The method comprises separating a polychromatic optical signal, received from an object having identifiable monochromatic pattern, into a plurality of wavelength components, separately capturing each of the wavelength components, reconstructing a plurality of images each from a different wavelength component, detecting the identifiable monochromatic pattern in one or more of the images, and extracting data associated with or encoded by the detected identifiable monochromatic pattern. The images have different depths of field.

19 Claims, 11 Drawing Sheets
(8 of 11 Drawing Sheet(s) Filed in Color)

FIG. 8

DEVICES AND METHODS OF READING MONOCHROMATIC PATTERNS

RELATED APPLICATION

This application claims the benefit of priority under 35 USC 119(e) of U.S. Provisional Patent Application No. 61/312,675 filed Mar. 11, 2010, the contents of which are incorporated herein by reference in their entirety.

FIELD AND BACKGROUND OF THE INVENTION

The present invention, in some embodiments thereof, relates to automatic data analysis and, more particularly, but not exclusively, to devices and methods of reading monochromatic representation of data from various distances.

One of the cornerstones of logistics and monitoring is object labeling. The ability to identify efficiently merchandise and manufacturing products allows improving trade, inventory tracking and manufacture processes. One of the most common object labeling methods is using optical machine-readable representation of data, such as barcodes, for labeling. The readers for identifying machine-readable representations generally consist of two main types: flying spot scanners (E. Barkan and J. Swartz, "System design considerations in bar-code laser scanning", Opt. Eng. 23, 413-420(1984)) and electronic imagers (D. Tsi, E. Marom, J. Katz, and J. Swartz, "System analysis of CCD-based Barcode readers", App. Opt 32, 3504-3512(1993)), Garcia, J., Sanchez, J. M., Orriols, X. and Binefa, X., "Chromatic aberration and depth extraction", Proc. of IEEE Conference on Pattern Recognition 1, 762-765(2000), and B. Fishbain, I. A. Ideses, G. Shabat, B. G. "Salomon and L. P. Yaroslaysky, "Superresolution in color videos acquired through turbulent media", Opt. Letters 34 1025-1036 (2009, and Bulana, V. Mongab and G. Sharma, "High capacity color barcodes using dot orientation and color separability", SPIE-IS&T, 7254 (2009). Flying spot scanners use a beam that runs across a barcode, whereas electronic imagers analyze and process the entire barcode image captured as a whole. Both types rely on the fact that the barcode is mono-color (black and white mostly) on a white background and color information is irrelevant. The depth of field of such systems is determined by the highest spatial frequency of the barcode.

Several methods have been presented recently to extend the effective depth of field (DOF) of these readers, usually by introducing additional elements, such as masks and/or by modifying conventional lens elements.

For example, extended depth of field for imaging has been achieved using a lens with a focal distance that varies continuously within the lens aperture, such as a logarithmic aspheric, see, for example W. Chi and N. George, "Electronic imaging using a logarithmic asphere", Opt. Lett, 26, 875-877 (2001). N George and W. Chi, "Computational imaging with the logarithmic asphere: theory", J. Opt. Soc. Am. A 20, 2260-2273(2003) and K. Chu, N. George, and W. Chi, "Extending the depth of field through unbalanced optical path difference, App. Opt. 47, 6895-6903(2008), which are incorporated herein by reference. For various distances, annular portions of the lens are set to provide a sharp image. The remaining part of the lens gives a blurred image so that the captured image has to be corrected, for example by post processing.

Other solutions for extending the depth of field of a reader involve placing coding masks in the optical train. Such solutions require post-processing for reconstruction of high resolution images, see for example A. Levin, R. Fergus, F. Durand and William T. Freeman, "Image and depth from a conventional camera with a coded aperture", ACM Transactions on Graphics (TOG) 26, Issue 3(2007) and W. Thomas Cathey and Edward R. Dowski, "New paradigm for imaging systems", App. Opt. 41, 6080-692(2002).

Other solutions for extending the depth of field of a reader involve placing phase masks with one or several annular rings creating a phase difference of $\pi$ in the optical train, see, for example E. Ben Eliezer, N. Konforti, B. Milgrom and E. Marom, "An optimal binary amplitude-phase mask for hybrid imaging systems that exhibit high resolution and extended depth of field", Optics Express 16, 20540-20561(2008), and B. Milgrom, N. Konforti, M. A. Golub and E. Marom, "Improved pupil coding masks for imaging polychromatic scenes with high resolution and extended depth of field", Optics Express, Vol. 18, Issue 15, pp. 15569-15584 (2010) doi:10.1364/OE.18.015569.

SUMMARY OF THE INVENTION

According to some embodiments of the present invention, there is provided a method of extracting data from an identifiable monochromatic pattern. The method comprises separating a polychromatic optical signal, received from an object having identifiable monochromatic pattern, into a plurality of wavelength components, separately capturing each of the plurality of wavelength components, reconstructing a plurality of images each from a different of the plurality of wavelength components, detecting the identifiable monochromatic pattern in at least one of the plurality of images, and extracting data associated with or encoded by the detected identifiable monochromatic pattern. Each of the plurality of images has a different depth of field.

Optionally, the identifiable monochromatic pattern comprises a monochromatic representation of the data.

Optionally, the identifiable monochromatic pattern comprises at least one of a contour and an outline of a human face.

Optionally, the identifiable monochromatic pattern comprises at least one of a contour and an outline of an article.

Optionally, each of the plurality of images having a depth of field which overlaps with another depth of field of another the image.

Optionally, the separating is performed so that a defocusing parameter of each image reconstructed from the wavelength component is at a different distance from a reference nominal point.

Optionally, the separating is performed so that each of the plurality of wavelength components is set to reconstruct an image having defocusing parameter of each respective the image is between 3 radians and 6 radians.

Optionally, the plurality of wavelength components are red, green, and blue color bands.

Optionally, the plurality of wavelength components comprises at least one of infrared band and ultraviolet band.

Optionally, the detecting comprises identifying the presence or absence of the identifiable monochromatic pattern in each of the plurality of images.

More optionally, the identifying is performed according to barcode encoding symbology.

More optionally, the identifying is performed according location information indicative of the location of the identifiable monochromatic pattern.

According to some embodiments of the present invention, there is provided a device of extracting data from an identifiable monochromatic pattern. The device comprises an optical assembly which separates a polychromatic optical signal received from an object with an identifiable monochromatic pattern into a plurality of wavelength components, an image sensor which separately captures each of the plurality of wavelength components, and a processing unit which reconstructs a plurality of images from the plurality of wavelength components, detects the identifiable monochromatic pattern in at least one of the plurality of images, and extracts data associated with or encoded by the identifiable monochromatic pattern. Each of the plurality of images has a different depth of field.

Optionally, the optical assembly includes a mask with at least one concentric ring that exhibits a phase shift different that of the remaining mask regions.

More optionally, the at least one concentric ring for optically delivering an exhibited phase shift of $\Pi$ (modulus) for a first wavelength component a phase shift of 0 (mod $2\pi$) for the second wavelength component, and an exhibited phase shift of $\Pi/2$ (mod)) for the third wavelength component.

More optionally, the at least one concentric ring for optically delivering an exhibited phase of $3\Pi$ for a first wavelength component, an exhibited phase of $2.45\Pi$ for a second wavelength component, and an exhibited phase of 2.077 for a third wavelength component.

Optionally, the optical assembly having a mask that exhibits different phases for different wavelength components.

Optionally, the optical assembly includes a mask with a single ring that extends between 0.1 and 0.7 of a radius of the mask.

Optionally, the image sensor is an active pixel image sensor converting the plurality of wavelength components to three separated color channels; the processing unit reconstructs each of the plurality of images.

Optionally, the optical assembly captures images exhibiting a modulation transfer function (MTF) with a contrast of at least 25%.

According to some embodiments of the present invention, there is provided an optical assembly for magnifying an effective reading range of a reading device for identifying identifiable monochromatic patterns. The optical assembly comprises an optical element which separates a polychromatic optical signal received from an object having an identifiable monochromatic pattern into a plurality of wavelength components. The plurality of wavelength components are set so as to allow reconstructing a plurality of images of the identifiable monochromatic pattern, the plurality of images having different depth of fields.

Optionally, the optical assembly further comprises an adaptor which allows connecting the optical element to an optical train of an image sensor of a reading device.

More optionally, the optical assembly further comprises changing color filter that allows a first of the plurality of wavelength components to pass separately along the optical train in a first time interval while filtering a second of the plurality of wavelength components and allows the second wavelength component to pass separately along the optical train in a second time interval while filtering the first wavelength component.

According to some embodiments of the present invention, there is provided a method of analyzing a plurality of color channels of an image sensor. The method comprises receiving, at a plurality of channels of an image sensor, a plurality of wavelength component signals which are optically separated from a polychromatic optical signal received from an object having an identifiable monochromatic pattern, reconstructing a plurality of images each from a different of the plurality of channels, detecting the identifiable monochromatic pattern in at least one of the plurality of images, and extracting data associated with or encoded by the detected identifiable monochromatic pattern. Each of the plurality of images has a different depth of field.

Optionally, the image sensor is a red, green and blue (RGB) image sensor and the plurality of channels are red, green and blue color channels.

According to some embodiments of the present invention, there is provided a device of extracting data from an identifiable monochromatic pattern. The device comprises an illumination source which illuminates an object having an identifiable monochromatic pattern with a plurality of wavelength component signals, an optical element which optically delivers a different exhibited phase shift for each of the plurality of wavelength component signals, an image sensor which separately captures a plurality of reflections each of a different of the plurality of wavelength component signals from the object, and a processing unit which reconstructs a plurality of images each from a different of the plurality of reflections, detects the identifiable monochromatic pattern in at least one of the plurality of images, and extracts data associated with or encoded by the identifiable monochromatic pattern. Each of the plurality of images having a different depth of field.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart of a method of reading data by an analysis of wavelength components of a polychromatic optical signal received from a monochromatic representation of the data, according to some embodiments of the present invention;

Figure 1:
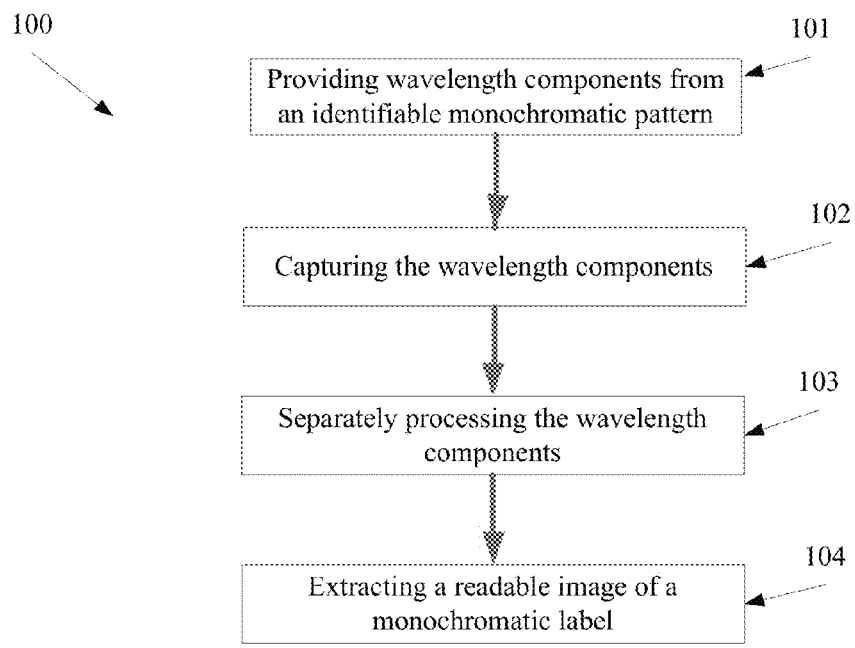
Figure 2A:
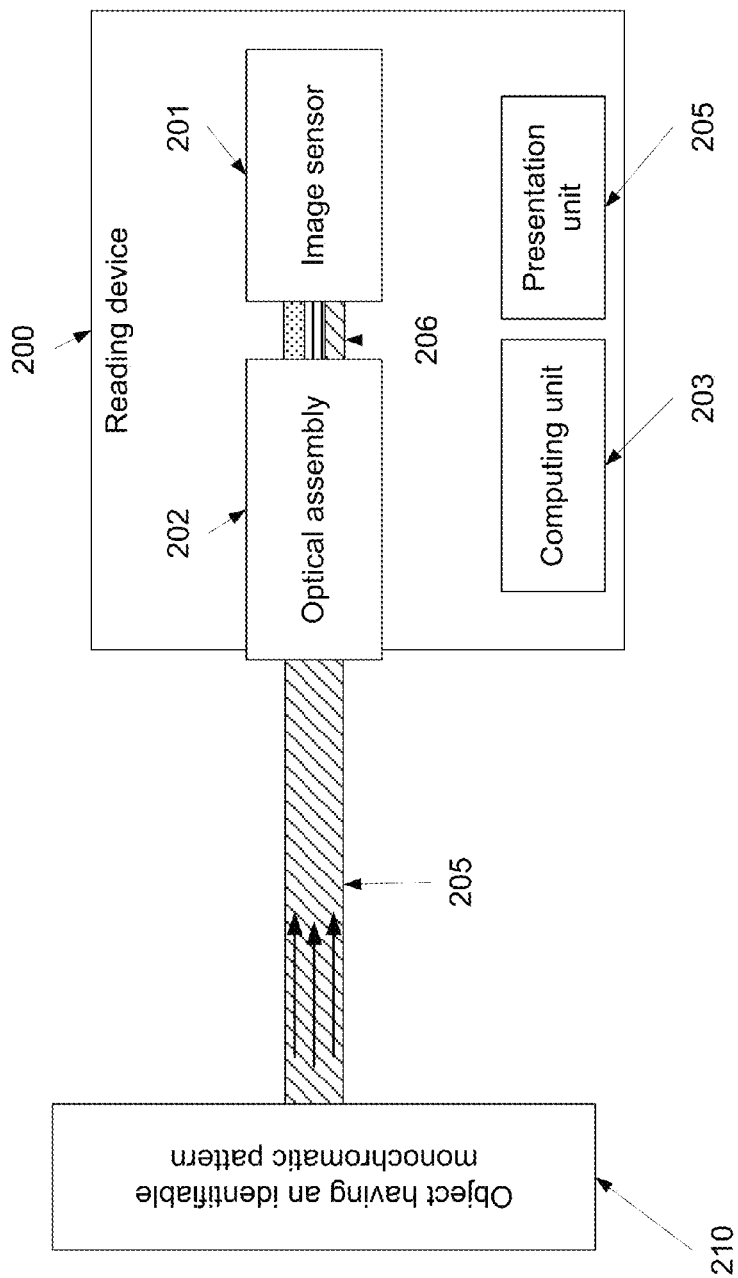
Figure 2B:
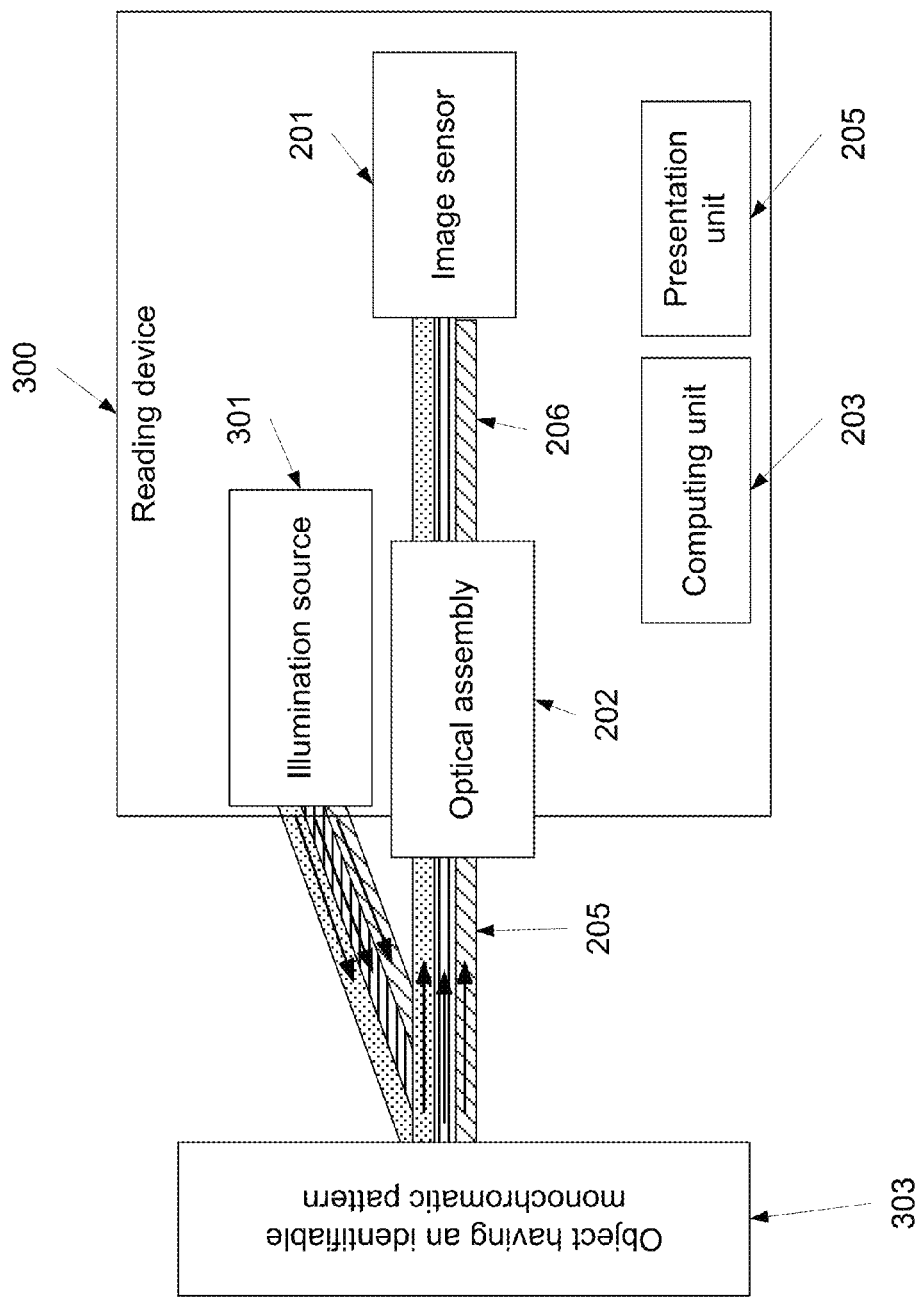
Figure 3:
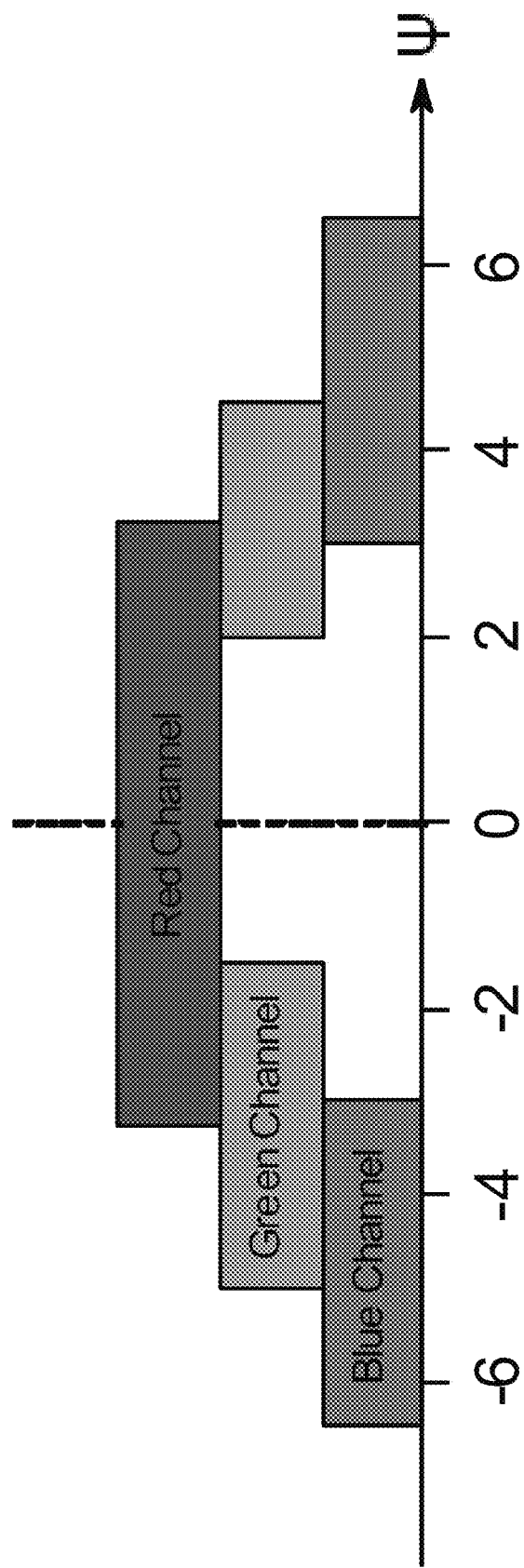
Figure 4:
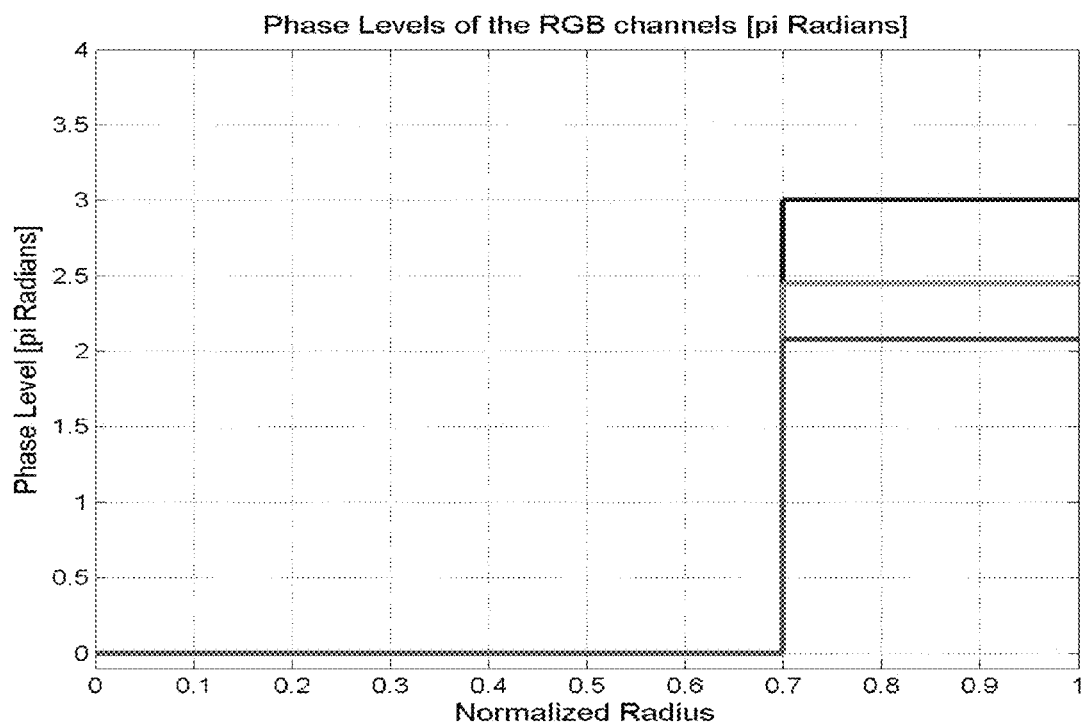
Figure 5A:
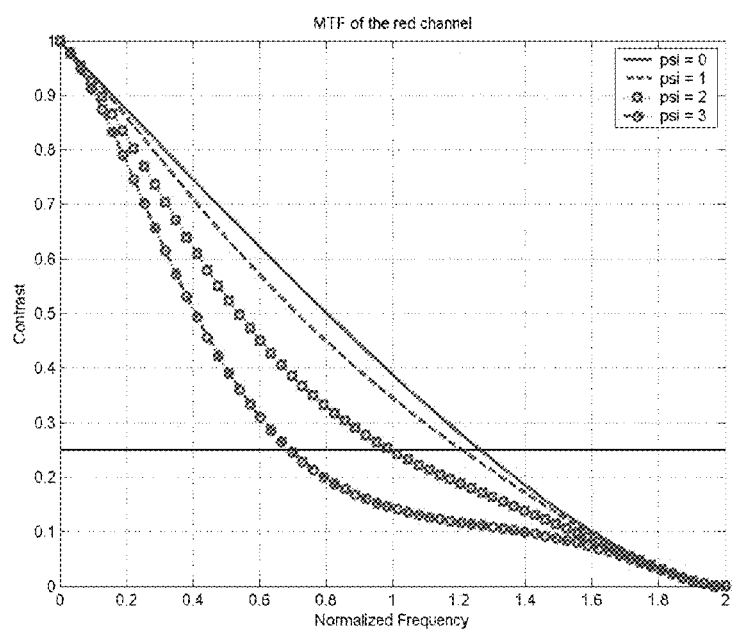
Figure 5B:
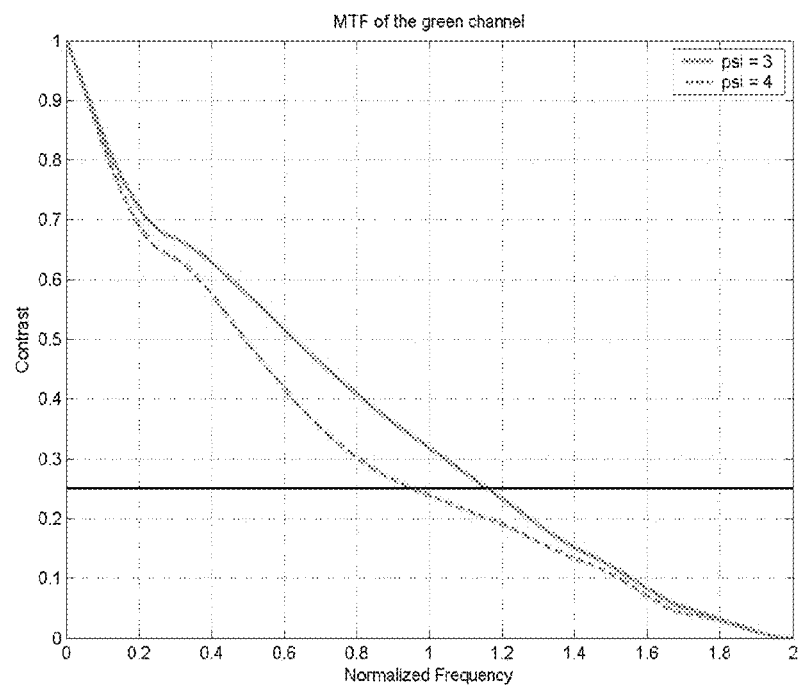
Figure 5C:
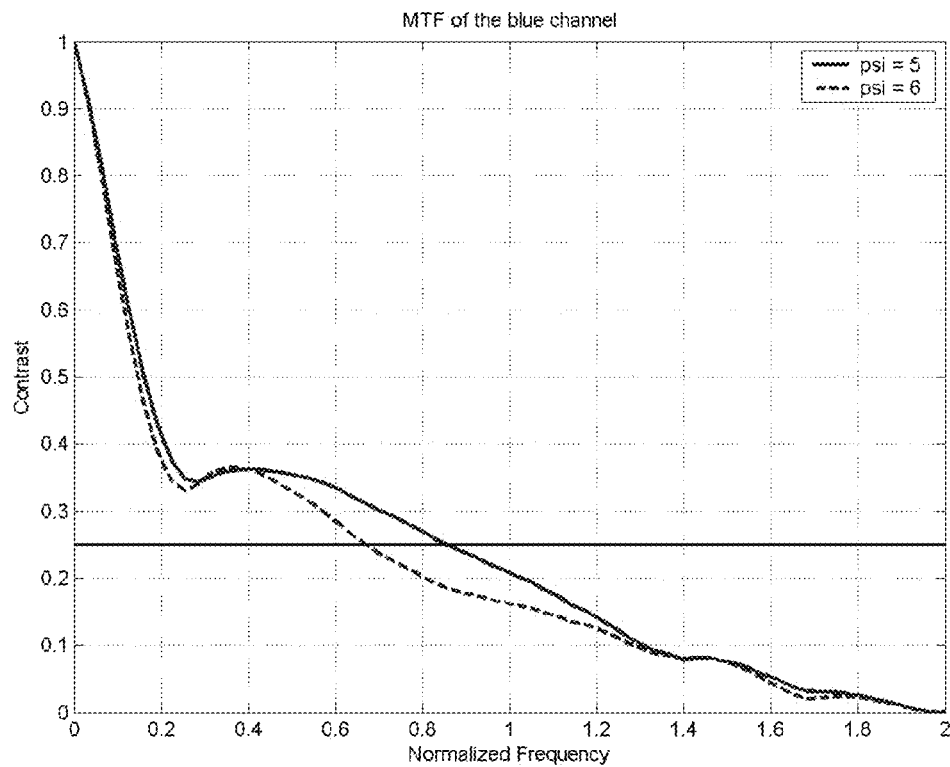
Figure 6:
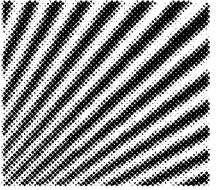
Figure 7:
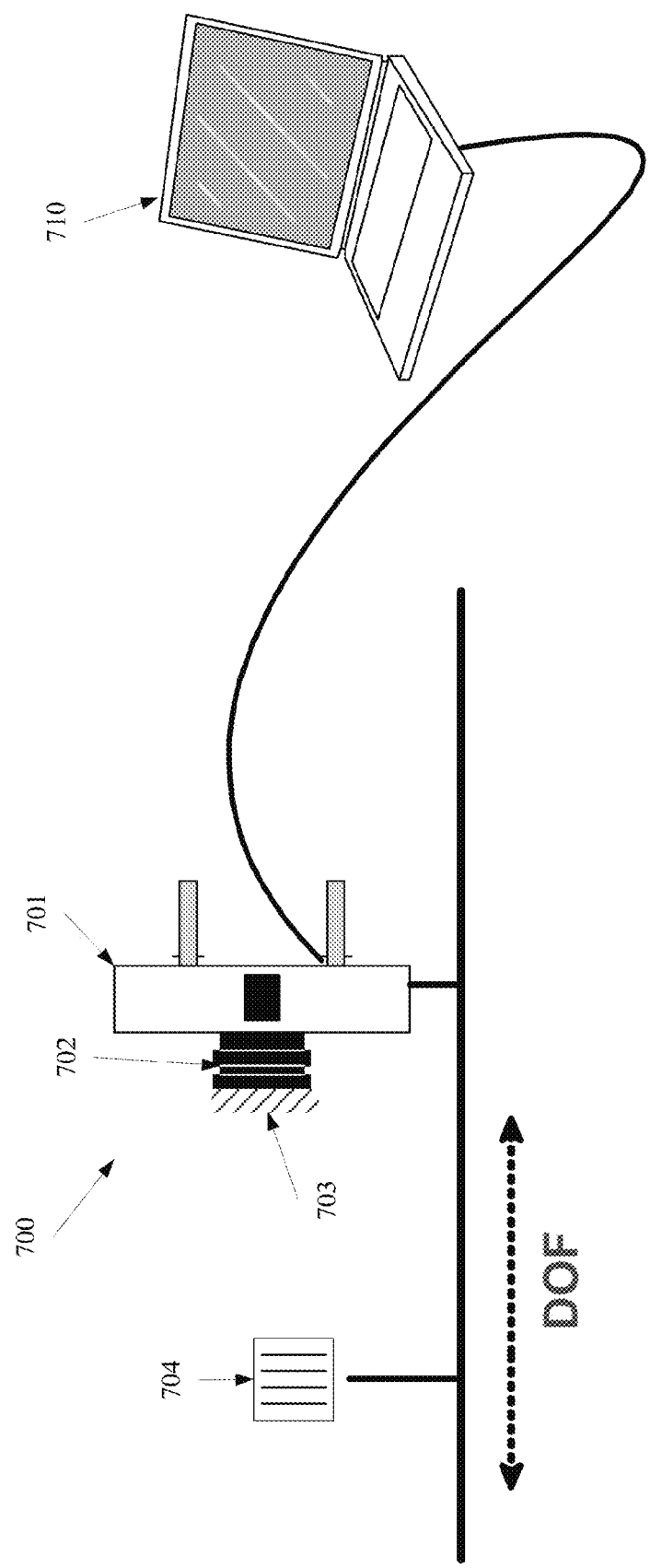
Figure 9:
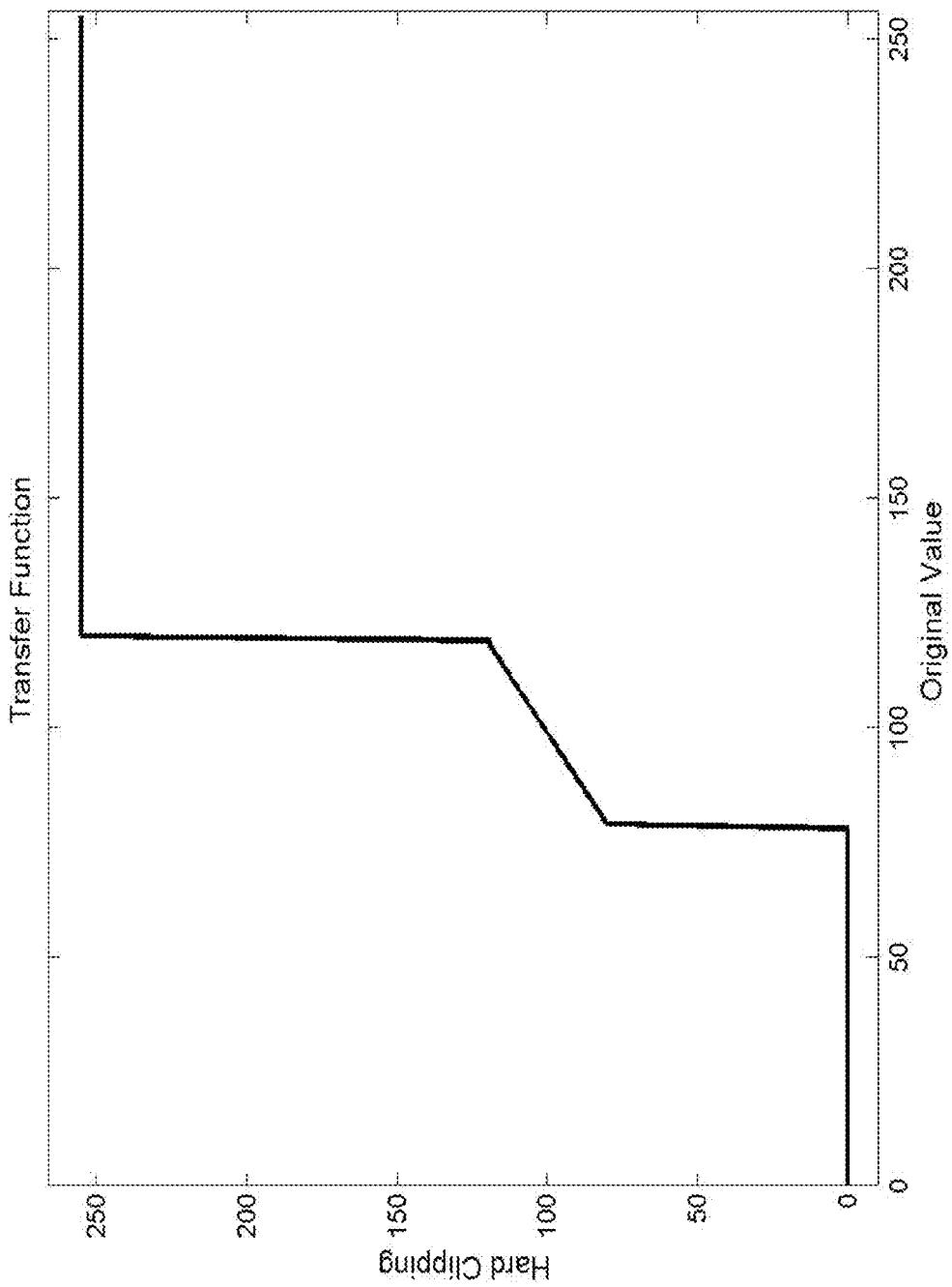
Figure 10A:
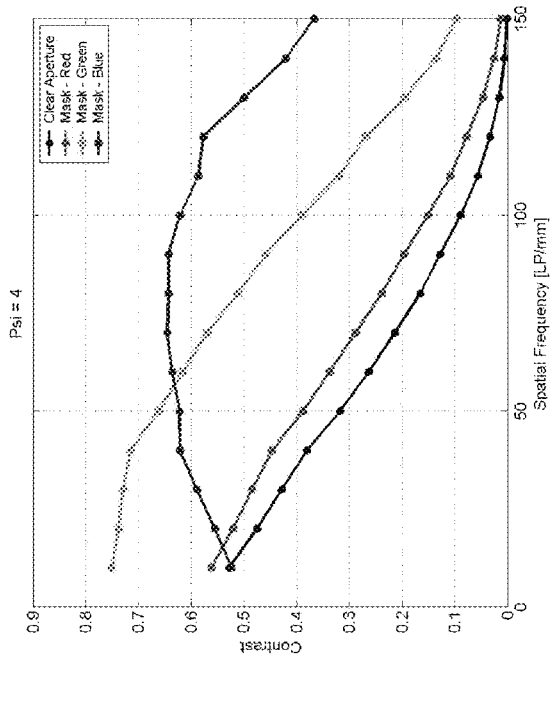
Figure 10B:
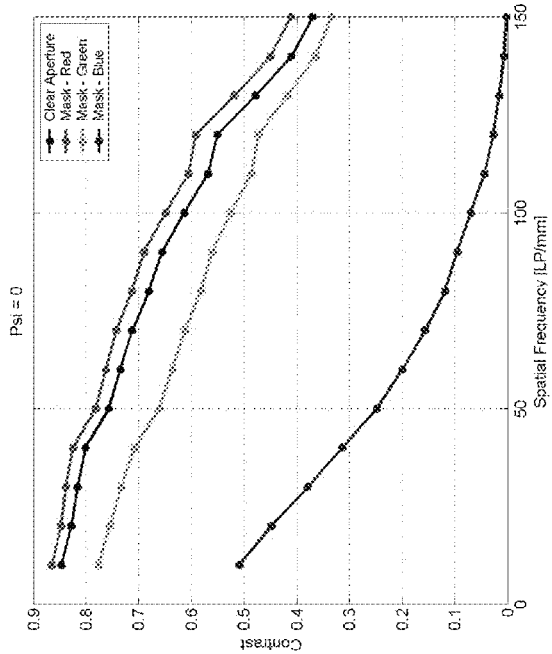
Figure 10C:
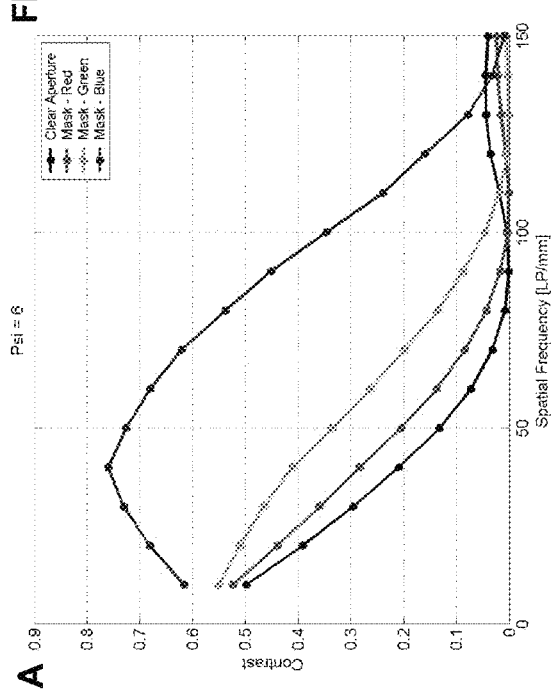

FIG. 2A, which is a schematic illustration of a reading device for reading monochromatic representations using an optical assembly for separating a polychromatic optical signals into monochromatic components, for example by implementing the process depicted in FIG. 1, according to some embodiments of the present invention;

FIG. 2B is a schematic illustration of a reading device that is similar to the reading device depicted in FIG. 2A with an illumination source for illuminating an object having an identifiable monochromatic pattern, according to some embodiments of the present invention;

FIG. 3 is a graph that schematically depicts an effective reading range of a reading device that separately processes R, G, and B wavelength components from, according to some embodiments of the present invention;

FIG. 4 is a graph that schematically depicts phase levels of RGB color channels of an RGB image sensor which are generated when an optical assembly having a normalized radius is placed in front of the RGB image sensor, according to some embodiments of the present invention;

FIGS. 5A-5C are graphs depicting modulation transfer function (MTF) curves achieved with an optical assembly for different values of $\psi$, according to some embodiments of the present invention;

FIG. 6 is a table depicting the images of a "rosette" label as acquired from the analysis of the 3 color bands in three separated channels, generated using an optical assembly that includes a mask, for different values of $\psi$, according to some embodiments of the present invention;

FIG. 7, which is a schematic illustration of an exemplary system defined according to some embodiments of the present invention;

Figure 8:
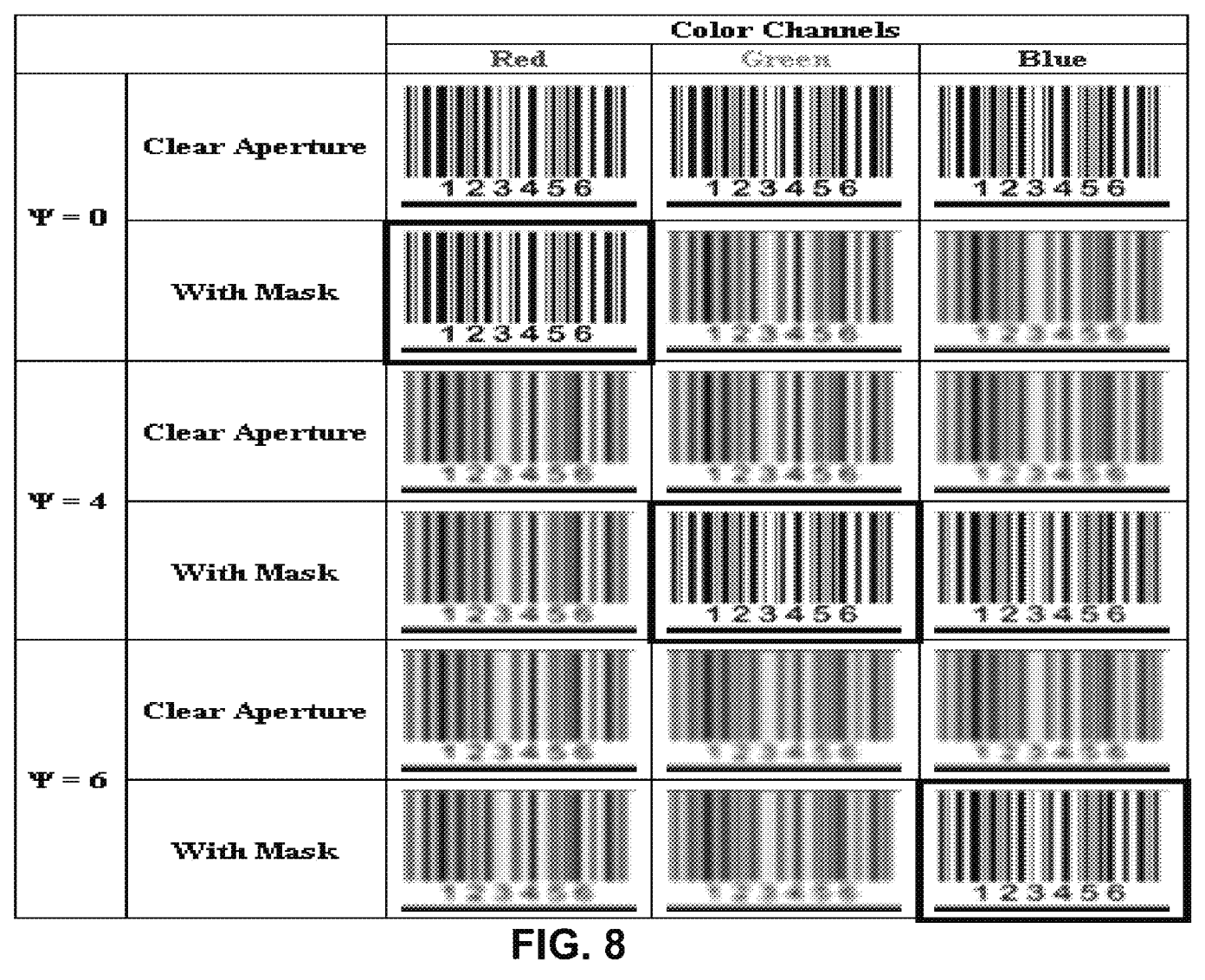

FIG. 8 is a table with a plurality of images, captured using the exemplary system depicted in FIG. 7, of a standard 7.5 millimeter barcode positioned at three different distances;

FIG. 9 is a graph depicting a non-linear function to be used in the post acquisition post processing stage; and FIGS. 10A-10C are schematic illustrations of graphs illustrating contrast levels in relation to spatial frequency for different color channels (Red, Green and Blue curves) at three different defocus parameters.

DESCRIPTION OF EMBODIMENTS OF THE INVENTION

The present invention, in some embodiments thereof, relates to automatic data analysis and, more particularly, but not exclusively, to devices and methods of reading monochromatic representation of data from various distances.

According to some embodiments of the present invention, there are provided methods and devices for reading data by independently analyzing wavelength components of a polychromatic optical signal or a sequence of two or more monochromatic optical signals received from an object having identifiable monochromatic pattern, such as a human face, an article having a defined contour, and a monochromatic representation of the data, such as a barcode or a license plate. The independent analysis of different wavelength components, such as red, green, and blue color bands, allows increasing the effective reading range of identifiable monochromatic patterns. Each wavelength component allows reconstructing a different image of a region that includes an identifiable monochromatic pattern with a different effective depth of field. The ability to analyze different images with different depths of field increases the effective range at which a reading device may be placed in front of an identifiable monochromatic pattern, such as a readable monochromatic representation. The different depths of field are optionally partly overlapping or colliding.

According to some embodiments of the present invention, there is provided a device of reading a monochromatic representation of data. The device includes an optical assembly, such as an optical mask or a diffractive element, which separates a polychromatic optical signal, received from an object having an identifiable monochromatic pattern into a plurality of wavelength components and an image sensor which separately captures each one of the wavelength components. The device further includes a processing unit which reconstructs images from the wavelength components and extracts the data pertaining to the identifiable monochromatic pattern from one or more of the images, where each image has a different depth of field. Optionally, the optical assembly is set so that a defocusing parameter of each image is at a different distance away from a chosen in-focus distance.

According to some other embodiments of the present invention, there is provided a device of reading a monochromatic representation of data based on reflections of monochromatic illuminations. The device includes an illumination source, such as an array of light emitting diodes, which illuminates an object having identifiable monochromatic pattern with a plurality of wavelength component optical signals and an image sensor which separately captures each one of the wavelength components. The device further includes a processing unit which reconstructs images as outlined above and described below.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart 100 of a method of extracting data by an analysis of wavelength components of a polychromatic optical signal received from an object having an identifiable monochromatic pattern such as a monochromatic representation of the data, for example a barcode or a license plate, an article and human face, according to some embodiments of the present invention. Reference is also made to FIG. 2A, which is a schematic illustration of a reading device 200 that is used for extracting data pertaining to an identifiable monochromatic pattern, for example reading monochromatic representations and/or patterns, for example by implementing the process depicted in FIG. 1, according to some embodiments of the present invention.

The reading device 200, which may be a handheld device, includes an image sensor, for example an active pixel image sensor 201, such as a CCD based sensor or a CMOS based sensor, optionally with a Bayer filter. The reading device 200 includes a computing unit 203, such as a digital signal processing (DSP) unit and/or a microprocessor. The reading device 200 may be integrated into an existing hardware such as a laptop, a desktop, a tablet, and/or a Smartphone and/or communicate with such devices, for example using their computing units as the computing unit 203. The reading device 200 optionally comprises an optical assembly 202, such as a mask, a lens, or a set of lenses. The optical assembly 202 is placed in front of the image sensor 201, for example aligned along a common axis between the image sensor 201 and an entrance aperture of the reading device. The optical assembly 202 is designed to separate a polychromatic optical signal 205 received from an object having an identifiable monochromatic pattern 210 into a plurality of wavelength components 206, for example by using an optical mask, a diffractive element, and/or a multi ring lens.

The reading device 200 optionally includes a presentation unit 205, such as a display, a speaker, and/or a tactile element, which are set to indicate about the success or failure of reading an identifiable monochromatic pattern, such as a monochromatic label, and optionally, to present the data which it encodes and/or data which is associated therewith. For example, the presentation unit 205 includes a speaker that allows playing a sound, such as a "beep" when a monochromatic label is successfully read by the reading device 200. The presentation unit 205 is connected and optionally operated by the computing unit 202.

As described in 101, a polychromatic optical signal or a sequence of a plurality of monochromatic optical signals is received from a region having an object with an identifiable monochromatic pattern such as monochromatic label and/or an object having an identifiable monochromatic pattern, for example incoherent light that is reflected from the monochromatic label or an object, such as a human face and/or an article, is optically converted, and for example separated, into a plurality of wavelength components, for example using the optical assembly 202. Optionally, an identifiable monochromatic pattern includes a monochromatic representation of data which may be any printed, projected, and/or displayed monochromatic label or tag that is indicative of object(s), character(s) and/or value(s), for example a printed barcode, a license plate, a displayed barcode, a projected barcode, a watermark, a visual sign, and the like. The identifiable monochromatic pattern may also be one or more facial characteristics, such as the outline or the contour of a human face, and/or visible characteristics of an article, such as the outline, the dimensions, and/or the contour thereof.

When the reading device 200 is used, polychromatic optical signals, such as incoherent light, or a sequence of a plurality of monochromatic optical signals are received, for example reflected, from the identifiable monochromatic pattern, and converted, for example optically separated, into a plurality of wavelength components, such as different color bands, for example red, green, blue, color bands and/or an infrared band and/or an ultraviolet band by the optical assembly 202. The polychromatic optical signals may be originated from spatially incoherent quasi-monochromatic illumination, referred to herein as incoherent illumination, such as natural light, which illuminates the object with the identifiable monochromatic pattern, for example a monochromatic representation of data, referred to herein as a monochromatic label. Alternatively, a sequence of a plurality of monochromatic optical signals may be originated from a light source, such as an array of light emitting diodes (LEDs) and/or any filtered illumination, which illuminates the object with the identifiable monochromatic pattern with different color bands, interchangeably, for example red, green and blue color bands. In such an embodiment, the image sensor may be a monochromatic image sensor 202 which separately processes the monochromatic optical signals in different, optionally sequential, cycles. For example, reference is now also made to FIG. 2B, which is a schematic illustration of a reading device 300 that is similar to the reading device in FIG. 2A (200), according to some embodiments of the present invention. In addition to the optical assembly 202 depicted in FIG. 2A, the reading device 300 includes an illumination source 301 for illuminating an object 303 having an identifiable monochromatic pattern with interchangeable color illuminations. In use, the illumination source 301 illuminates the object 303 in a sequence of two or more different wavelength component signals, for example different color bands, such as red, green and blue color bands. During the illumination, optionally in a coordinated manner, the image sensor 201 captures the reflections of the wavelength component signals from the object 303, via the optical assembly 202. The optical assembly 202 provides a different response to each one of the channels of information.

Then, the image sensor 201 generates a plurality of gray level images and identifies an in focus representation of the identifiable monochromatic pattern in at least one of the images. As each one of the images has a different effective DOF, the range of distances at which the object 300 may be from the reading device 300 is wider than the range of distances at which similar objects 300 may be from reading devices 300 which are based on the analysis of a single gray level image.

With reference to FIG. 1 and FIG. 2A, and as further described below, the polychromatic optical signal is converted, for example optically separated, into wavelength components which may be processed to reconstruct images of the same region having different effective DOFs. As used herein, an effective DOF of a wavelength component is a distance from the optical assembly 202 that allows the reading device 200 to extract monochromatic labels from the processing of the respective wavelength component. This distance is optionally defined by a defocus parameter, for example a defocus parameter of about $\psi=+/-6$ radians where $\psi$ denotes a defocus parameter. The effective DOFs of the images are optionally overlapping on an axis from the optical assembly 202. For example, FIG. 3 is a graph that schematically depicts the effective DOF of images reconstructed form R, G, and B wavelength components which are separated from the polychromatic optical signal using the optical assembly 202 or acquired in sequential illumination cycles. The total range that is covered by these effective DOFs is the effective reading range, also referred to as effective reading range, of the device 200. The graph includes a scale defining a range of possible defocus parameter, in relation to an in-focus distance ($\psi=0$) and the range of defocus parameters of each wavelength component in relation to the scale.

Optionally, the optical assembly 202 includes a mask with one or more concentric rings. Optionally, the optical assembly 202 includes a single ring that extends between 0.1 and 0.7 of the radius of the mask.

Optionally, the optical assembly 202 includes a simple circularly symmetric binary phase optical structure or a phase mask which provides, in the optical train of the optical assembly 202, different response for the three channels of information. Optionally, the optical assembly 202 includes a mask having a single phase ring that allows the acquisition of images with a relatively good contrast, for example above 25%. Operation at a lower contrast level and wider effective reading range is possible with a higher number of phase rings.

Optionally, the optical assembly 202 includes a lens, optionally elliptical, that substantially evenly spread the wavelength components over the image sensor 201. In such a manner, the face of the monochromatic label may be tilted in relation to the image sensor 201.

As shown at, 102, each one of the wavelength components is captured, optionally separately, for example by the active pixel image sensor 201. Optionally, the active pixel image sensor 201 has three different color channels organized in the form of a Bayer Matrix where 50% of the sensing area is allocated to green, 25% of the sensing area is allocated to red and 25% of the sensing area is allocated to blue. The wavelength components, which are intercepted by the active pixel image sensor 201, may be separated in a process known as de-bayering or demosaicing, for example using the computing unit 203.

Now, as shown at 103, each one of the wavelength components, for example in a respective color channel, is processed separately to allow the reconstruction of an image, such as a gray level image, therefrom. In such a manner, the presence or absence of a monochromatic label in the effective DOF of each image is detected independently. In addition, an image that presents the identifiable monochromatic pattern in a readable manner may be extracted from at least one of the wavelength components. The processing may be performed by reconstructing separate images of the same region from the color channels. As different images are reconstructed from different wavelength components and therefore have different effective DOFs, a sharp image of the monochromatic label may be captured from any of the effective DOFs, the effective reading range of the reading device increases in relation to the effective reading range of a reading device that analysis the polychromatic optical signal, for example as further described below or the reflections of a sequence of monochromatic illuminations, for example as depicted in FIG. 2B. This allows, as shown at 104, extracting the data that is represented in and/or associated with the identifiable monochromatic pattern from one or more of the wavelength components separately, for example using the computing unit 204. Optionally, a decoding algorithm is used to identify the presence and/or the absence of an identifiable monochromatic pattern in each one of the images independently. The identification of the identifiable monochromatic pattern during the processing of more than one wavelength component increases the robustness of the detection.

According to some embodiment of the present invention, the identifiable monochromatic pattern is of a human face monochromatic pattern. In such embodiments, the images, which are optionally gray level images, are separately processed according to a face detection algorithm. In such a manner, the reading device 200 may be a face detection system that is placed to image an area wherein people are passing. In use, the reading device 200 captures incoherent light reflected from the faces of passersby in a certain space, separates it to wavelength components, and reconstructs gray level images therefrom. As each gray level image has a different effective DOF, a clear image of the contour and/or the outline of the face of a passerby may be captured from a wider range of distances from the reading device 200 in the certain space. In such a manner, the probability of capturing an in focus image of the contour and/or the outline of the face of a passerby and the identification rate of the reading device 200 in relation to a face detection system that uses a regular camera with a less effective range is increased.

According to some embodiment of the present invention, the identifiable monochromatic pattern is a monochromatic representation of a vehicle's identification number, for example a license plate. In such embodiments, the images, which are optionally gray level images, are separately processed according to a license plate detection algorithm, for example as described in J. Hsieh, S. Yu, and Y. Chen. Morphology based license plate detection from complex scenes. 2002 which is incorporated herein by reference. In such a manner, the reading device 200 may be a license plate detection system that is placed to image a road wherein a plurality of vehicles are passing, for example a toll road. In use, the reading device 200 captures incoherent light reflected from the license plates of passing vehicles in one or more lanes, separates it to wavelength components, and reconstructs gray level images therefrom. As each gray level image has a different effective DOF, a clear image of the license plate of a passing vehicle may be captured from a wider range of distances from the reading device 200 in the one or more lanes. In such a manner, the probability of capturing an in focus image of the license plate of a passing vehicle and the identification rate of the reading device 200 in relation to a regular license plate system that uses a camera with a less effective range is increased.

Optionally, the computing unit 204 may be configured to select image information from a single wavelength component automatically, namely a single color band, based on label error indications, such as barcode encoding symbology generated during a decoding of a label encoding of image information from each color channel, a contrast estimation of one or more of the images generated according to the wavelength components, and/or location information indicative of the location of the label. Such location information may be gathered from a range sensor, such as a laser scanner, an ultrasound array and an infrared (IR) array. Optionally, the computing unit 204 may be configured to select image information from a single wavelength component manually, for example according to user definitions.

As described above, the polychromatic optical signal may be optically separated to wavelength components using the optical assembly 202. Reference is now made to an exemplary design of an optical assembly, such as 202, which may be used for converting, for example separating, a polychromatic optical signal into a plurality of wavelength components.

In order to allow the separation of a plurality of wavelength components from the polychromatic optical signal, the design of the optical assembly 202 takes into account wavelengths variations. Optionally, the optical assembly 202 provides different response for the three main wavelength components over the full visible spectrum (450-650 nm), red, green and blue (RGB). The wavelengths variations are utilized in a manner that the effective DOFs exhibited in images reconstructed from these wavelength components are sequential, optionally with some desired overlapping (superposition). As a result of that, the reader device 200 as a whole has a unified effective reading range which is wider than any of the effective DOFs of the wavelength components separately.

Optionally, the optical assembly 202 has a clear aperture where the best MTF is obtained for relatively small $\psi$ values. For example, the region surrounding the in-focus position, one should design a mask that functions as a clear aperture for one of the wavelength components, while the effective DOF of images reconstructed from the other wavelength components provide operation conditions adapted for higher values of different defocus parameter (psi).

Optionally, the design is for optical assemblies, such as masks, which include one or more concentric phase rings, such that at one wavelength component (i.e. blue, B) the exhibited phase is $\pi$ (modulus $2\pi$), at another wavelength component (i.e. Red, R) the exhibited phase of the rings is 0 (mod $2\pi$), and at an intermediate wavelength component (i.e.

green, G) the exhibited phase is approximately π/2 (mod 2π). For example, the optical assembly is an etched or deposited layer having a phase difference of 3π for Blue (450 nanometer (nm)), 2.45π phase for Green (550 nm), and 2.077π phase for Red (650 nm).

Optionally, the ring radii of the optical assembly 202 are designed so that the effective DOF of an image reconstructed by each wavelength component overlaps or collides with the effective DOF images reconstructed from other wavelength component(s).

Optionally, the optical assembly 202 has a clear aperture that provides acceptable performances in terms of modulation transfer function (MTF) contrast and cut-off frequency limit up to an out-of-focus position defined as ψ=3.3. This is achieved by the response provided by the red channel.

Optionally, the optical assembly 202 has a ring distribution that provides acceptable performance for ψ out-of-focus condition extending between 3 radians and 6 radians in at least one of the wavelength components, for example for the blue wavelength component.

Optionally, the optical assembly 202 is designed so that the DOF of the green wavelength component overlaps with the DOF of the red and the blue wavelength components. Optionally, the overlapping DOF of the wavelength components covers a DOF of ψ=±6, for example as shown at FIG. 3. It should be noted that the green wavelength component covers an intermediate depth that allows some flexibility in the determination of the limits provided by the red and blue wavelength components. Optionally, as shown at FIG. 3, the effective DOFs cover a continuous depth with no gaps.

Optionally, the optical assembly 202 has an MTF with a contrast of at least 25%, optionally up to a normalized cut-off spatial frequency of 0.6. In such a manner, the diffraction that limits spatial frequency is defined as 2.0.

Optionally, the optical assembly 202 is designed by calculating radii $r_1, r_2, r_3, r_4$, such that $r_1 \geq r_2 \geq r_3 \geq r_4$ when these radii have possible values between 0 (center of the aperture) and 1 (normalized aperture size). Due to the limited number of variables, a direct brute force approach may be used. The radii are changed by an increment of 0.01 per iteration. For each set of $r_1, r_2, r_3, r_4$ values, the MTF of the optical assembly 202 for all values of ψ in the sought range of 4 to 6 is calculated. For each MTF curve, the highest frequency for which the contrast is above 25% is recorded. Each set of $r_1, r_2, r_3, r_4$ may be than associated with a single cut-off spatial frequency value. The highest of these cut-off spatial frequencies corresponds to the best obtainable mask that includes two phase rings $[r_1, r_2]$ and $[r_3, r_4]$.

Optionally, an effective DOF as described above is achieved by a single ring extending from a pupil edge outside radius up to a normalized radius of 0.7. The contrast achieved with such a mask is above 25% of the spatial spectrum. 2.0 is a cut off frequency of a diffraction limited system. For example, the graph of FIG. 4 schematically depicts phase levels of RGB color channels of an RGB image sensor which are generated when an optical assembly having a normalized radius is placed in front of the RGB image sensor.

Reference is now made to FIGS. 5A-5C which are graphs depicting MTF curves achieved with an optical assembly 202 for different values of ψ where FIG. 5A depicts the MTF curve of the red wavelength component, FIG. 5B depicts the MTF curve of the green wavelength component, and FIG. 5C depicts the MTF curve of the blue wavelength component.

Reference is now made to a mathematical description of the separating of the polychromatic optical signal into a plurality of wavelength components where each wavelength component is reconstructed to form an image with a different effective DOF.

A defocus aberration manifests itself by a quadratic phase at the imaging system pupil, so that:

$$G(u,v;\psi) = \exp[j\psi(u^2+v^2)],\qquad \text{Equation 1:}$$

where (u,v) denotes coordinates at a pupil plane normalized to a pupil's semi-diameter and ψ denotes a defocus parameter in radians which may be defined as follows:

$$\psi = \frac{\pi L^2}{4\lambda}\left(\frac{1}{d_{obj}} + \frac{1}{d_{img}} - \frac{1}{f}\right). \qquad \text{Equation 2}$$

where L denotes a pupil dimension, λ denotes wavelength, and f, $d_{obj}$ and $d_{img}$ denote lens focal length, and distances between the object and the image to the lens respectively. Clearly, in an in-focus position, ψ=0. When defocus occurs, the phase factor, given in Equation 1, multiplies the pupil of the imaging system, resulting in a generalized pupil, expressed by the following expression:

$$P'(u,v) = P(u,v)\exp[j\psi(u^2+v^2)] \qquad \text{Equation 3:}$$

where P(u,v) denotes a pupil function. Due to the quadratic defocusing term, the object is not imaged in the expected plane, where the image sensor 201 is located, but in a different one. Therefore, the detector acquires a degraded image.

As the polychromatic optical signal is based on incoherent illumination such as a light source, the intensity of the output of the optical assembly 202 is linear, contrary to the linearity with respect to the field distribution, as is the case for coherent source illumination. The output intensity is then expressed by the convolution integral:

$$I_{out}(x,y) = \iint |h(x-x', y-y')|^2 I_g(x',y') dx' dy' \qquad \text{Equation 4:}$$

where x and y denote lateral coordinates in an image plain, Ig(x,y) denotes the intensity of the image, without diffraction, for example based on geometrical optics considerations, and h(x,y) denotes the coherent point spread function. According to Equation 4, the phase of the coherent point spread function may be irrelevant when considering incoherent illumination.

The optical transfer function (OTF) of the reading device 200 is the Fourier transform of the intensity impulse response, |h(x, y)|2, and it is related to the generalized pupil function, P'(u,v) by an auto-correlation operation. It is common practice to normalize the OTF to finally obtain the following result:

$$OTF(v_x, v_y) = \frac{\iint_\Omega \overline{P'}(u - v_x/2; v - v_y/2) P'(u + v_x/2; v + v_y/2) du\, dv}{\iint_\Omega \overline{P'}(u; v) P'(u; v) du\, dv} \qquad \text{Equation 5}$$

where $v_x$ and $v_y$ are normalized spatial frequencies and Ω denotes an integration domain. As indicated in Equation 2, a phase error in case of out-of-focus is an inverse function of the wavelength:

$$\psi \propto \left(\frac{1}{\lambda}\right). \qquad \text{Equation 6}$$

When the illumination is a polychromatic illumination, the parameter ψ varies with the wavelength so that:

$$\frac{\psi_{\lambda_1}}{\psi_{\lambda_2}} = \frac{\lambda_2}{\lambda_1} \qquad \text{Equation 7}$$

where although the focal distance F of a simple lens is a function of the wavelength, the lens assembly 202 is optionally chromatically corrected so that F as used herein is constant for all wavelengths in the visible spectrum.

By etching a depth of h into a glass plate with a refractive index of n, the following phase shift is exhibited:

$$\varphi = \frac{2\pi h*(n-1)}{\lambda} \qquad \text{Equation 8}$$

where n denotes a constant that does not vary significantly with the wavelength. The ratio between the phase shifts at two different wavelengths is thus:

$$\frac{\varphi_{\lambda_1}}{\varphi_{\lambda_2}} = \frac{\lambda_2}{\lambda_1} \qquad \text{Equation 9}$$

The third quantity that is influenced by the wavelength is the cut off frequency (COF), which for a diffraction limited (d.l.) system is:

$$COF_{d.l} = \frac{1}{\lambda F\#} \qquad \text{Equation 10}$$

where F# denotes L/F and L denotes a pupil diameter. Therefore, a variation of the cut off frequency with the wavelength is:

$$\frac{COF_{\lambda_1}}{COF_{\lambda_2}} = \frac{\lambda_2}{\lambda_1}. \qquad \text{Equation 11}$$

According to some embodiments of the present invention, there is provided an optical add-on for increasing the effective reading range of existing reading devices, such as barcode readers. The optical add-on includes an adaptor for placing of the optical add-on the optical train of an existing reading device and an optical assembly which is set to separate a polychromatic optical signal into wavelength components, such as red, blue, and red bands, for example as described above with relation to FIGS. 1 and 2. Optionally, the optical add-on includes a changing color filter. The changing color filter allows each one of the wavelength components to pass separately along the optical train in different time intervals. In such a manner, the existing reading device receives only one of the wavelength components at each interval. As each one of the wavelength components may be reconstructed to form an image having a different effective DOF, the total effective reading range of the reading device is the sum of the effective DOFs. In such a manner, the effective reading range of the reading device with the optical add-on is increased relatively to its effective reading range with a clear aperture.

It is expected that during the life of a patent maturing from this application many relevant systems and methods will be developed and the scope of the term optical assembly, computing unit, and image sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This has been calculated for a green wavelength, even when calculation applies to other colors or wavelengths. This is done for ease of calculating corresponding distances for the DOF evaluation at all wavelengths. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non limiting fashion.

A simulation program has been written in Matlab in order to verify the ability of an image sensor having a Bayer Matrix to acquire an image of the monochromatic label by separating a respective polychromatic optical signal into three wavelength components (color bands) and separately reconstructing three images. In the computer simulation, the monochromatic label is a "rosette" label consisting of 100 equally spaced spokes that exhibits, simultaneously, a wide range of spatial frequencies and orientations. According to theoretical predictions, the $\psi$ of the red band is between 0 and 3, the $\psi$ of the green band is between 2.5 and 5, and the $\psi$ of the blue band is between 5 and 6.25. The values of $\psi$, for example as depicted on the scale of the horizontal axis in FIG. 3, have been calculated for a green wavelength. The red band provides the sharpest image of the monochromatic label when $\psi<3$, hence little defocus. The green band provides the sharpest image in the mid-range and the blue channel provides the sharpest image towards the ends of the cumulative range covered by the effective DOFs. FIG. 6 is a table depicting the images of the "rosette" label as acquired from the analysis of the 3 bands in three separated channels, each generated using an optical assembly that includes a mask, for different values of $\psi$. The sharpest acquisition at each defocus condition is framed with a wide border.

Reference is now also made to FIG. 7, which is a schematic illustration of an exemplary system 700 defined according to some embodiments of the present invention. This exemplary system 700 has been used to gather the following experimental results. The system 300 includes an image sensor, a low-cost RGB camera [uEYE® 1225] 701, equipped with a CMOS detector with a resolution of 752×480 pixels. It was equipped with a lens 702 having an effective focal length of 16 mm [Computar® M1614W], a field of view (FOV) of 45 degrees along the sensor diagonal, and a pixel dimension of 6 μm. The low-cost RGB camera 701 is connected to a laptop 710 that functions as the above mentioned computing unit (see 203 of FIG. 2A). The image sensor was placed in various distances from a target label, between 8 cm and infinity at a nominal distance of 23 cm. The optical assembly has a pupil with a 2 mm diameter, compatible with the apertures of imaging systems used by commercial Barcode readers. Such a pupil has thus been inserted in the Computar® lens as a clear aperture when experimental results for an open aperture were collected. The optical assembly includes a fabricated mask 703 which has been placed in the pupil plane. The fabricated mask has a diameter of 2 mm. The mask is a binary amplitude phase mask with a single phase ring and a normalized cut-off spatial frequency of 0.6, whereby 2.0 is a diffraction limit cutoff. This cut off frequency (COF) value is compatible with the Nyquist frequency of the detector array. The camera was connected to a laptop for image processing.

The exemplary system 700 was used to capture images of a monochromatic label 704, such as a barcode and a rosette spoke target, with and without the mask. The position of the monochromatic labels was allowed to move over the entire depth region. For example, FIG. 8 depicts a table with a plurality of images, captured using the exemplary system, of a standard 7.5 millimeter barcode positioned at three different distances corresponding to $\psi=0$ (in focus position, 23 cm from the lens), $\psi\approx4$ (19.8 cm away from the lens) and $\psi\approx6$ (18.5 cm away). At each position, images obtained by the analysis of the RGB bands are provided via a clear aperture as well as via a mask-equipped pupil. As depicted in FIG. 8, at least one color band allows generating a sharp image of the monochromatic label that allows decoding data therefrom. However, if the mask was not placed at the optical train of the exemplary system, the label could be identified only in a narrow range of depths, around a fixed in-focus position in front of the exemplary system. The dimensions of the images have been normalized so that they appear in the figure as having same size, for ease of comparison. In order to better visualize the results obtained with the barcode imaged in FIG. 8, the images have been hard clipped, using a non-linear function provided in FIG. 9. FIG. 9 illustrates a clipping function applied on image information to provide the images of FIG. 8. The X-axis represents the original gray level and Y-axis represents the hard clipped levels.

Similar images where captured with a rosette spoke target as a label. Each radius of the rosette corresponds to a different spatial frequency. A Matlab code was written in order to find the fulcrum of the spokes in each image. Then, by a linear manipulation, each circle representing a certain spatial frequency was converted into a vector and the resulting image contrast was calculated. The results for images captured at $\psi\approx0$ (in focus position), $\psi\approx4$ and $\psi\approx6$ are presented in FIGS. 10A-10C, which illustrates contrast levels vs. spatial frequency for three different color channels (Red, Green and Blue curves) at three different defocus parameters: psi=0 (in-focus), psi=4 and psi=6. The black curve represents a clear aperture results (no mask).

As depicted in FIGS. 10A-10C, the red band provides the best results when the psi values are low. Those are even slightly better than the results obtainable with a clear aperture. The reason is that the results of the clear aperture are affected by the presence of all three wavelength components (R, G and B). The analysis of the red band is much more sensitive than the green and blue bands and provides higher contrast. Moreover, when in a defocus mode, the Red channel is less sensitive since the psi variations are smaller than for the other channels.

The barcode depicted in FIG. 8 was scanned using a commercial Metrologic barcode imager, MS-4980 having a resolution of 1280×960 pixels and a pixel size of 4 μm. The barcode imager managed to identify the barcode within an effective decoding range of 90-180 mm (the range at which labels can be read by the barcode imager). Then, the barcode imager was equipped a mask attached to its outer lens and captured the same image sequentially with a Red filter, a Green filter and s Blue filter separately. Since the barcode imager is equipped with a monochrome detector array, at each distance one of the filters was placed in front of the imager. Using the mask, together with the filters, extends the effective decoding range to between 70 mm and 241 mm. For a 13 millimeter barcode, the effective decoding range without the mask was between 55 mm and 250 mm and with the mask between 43 mm and 340 mm. It would have been possible to extend the low limit (43 mm) even further; however the field of view limited the barcode capturing capabilities.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of extracting data from an identifiable monochromatic pattern, said method comprising:

using a optical assembly having a mask with a at least concentric ring for separating a polychromatic optical signal, received from an object having identifiable monochromatic pattern, into a plurality of wavelength components;

using an image sensor having a plurality of color channels for separately capturing each of said plurality of wavelength components in another color channel of said plurality of color channels;

reconstructing a plurality of images each from a different color channel of said plurality of color channels that includes a different wavelength component of said plurality of wavelength components;

detecting said identifiable monochromatic pattern in at least one of said plurality of images; and extracting data associated with or encoded by said detected identifiable monochromatic pattern;

wherein each of said plurality of images has a different depth of field;

wherein said mask and said image sensor are aligned along a common axis.

2. The method of claim 1, wherein said identifiable monochromatic pattern comprises a monochromatic representation of said data.

3. The method of claim 1, wherein said identifiable monochromatic pattern comprises at least one of a contour and an outline of a human face.

4. The method of claim 1, wherein said identifiable monochromatic pattern comprises at least one of a contour and an outline of an article.

5. The method of claim 1, wherein each of said plurality of images having a depth of field which overlaps with another depth of field of another said image.

6. The method of claim 1, wherein said separating is performed so that a defocusing parameter of each image reconstructed from said wavelength component corresponds to a different distance from a reference nominal point.

7. The method of claim 1, wherein said separating is performed so that each of said plurality of wavelength components is set to reconstruct an image having a defocusing parameter between 3 radians and 6 radians.

8. The method of claim 1, wherein said plurality of wavelength components are red, green, and blue color bands.

9. The method of claim 1, wherein said plurality of wavelength components comprises at least one of infrared band and ultraviolet band.

10. The method of claim 1, wherein said detecting comprises identifying the presence or absence of said identifiable monochromatic pattern in each of said plurality of images.

11. The method of claim 10, wherein said identifying is performed according to barcode encoding symbology.

12. The method of claim 10, wherein said identifying is performed according location information indicative of the location of said identifiable monochromatic pattern.

13. A method of analyzing a plurality of color channels of an image sensor, said method comprising:

receiving, at each of a plurality of color channels of an image sensor, another wavelength component signal of a plurality of wavelength component signals which are optically separated from a polychromatic optical signal received from an object having an identifiable monochromatic pattern by a mask with a at least concentric ring of an optical assembly;

reconstructing a plurality of images each from a different of said plurality of color channels;

detecting said identifiable monochromatic pattern in at least one of said plurality of images; and extracting data associated with or encoded by said detected identifiable monochromatic pattern;

wherein each of said plurality of images has a different depth of field;

wherein said mask and said image sensor are aligned along a common axis.

14. The method of claim 13, wherein said image sensor is a red, green and blue (RGB) image sensor and said plurality of color channels are red, green and blue color channels.

15. The method of claim 1, wherein said image sensor is an active pixel image sensor converting said plurality of wavelength components to three separated color channels, each of said plurality of images is reconstructed from another of said plurality of wavelength components.

16. The method of claim 1, wherein said plurality of color channels are organized in the form of a Bayer Matrix.

17. The method of claim 1, wherein said image sensor captures said plurality of wavelength components at the same time.

18. The method of claim 1, wherein said at least concentric ring each having a different radius.

19. The method of claim 1, wherein said optical assembly is chromatically corrected.

* * * * *